United States Patent Office 3,115,169
Patented Dec. 24, 1963

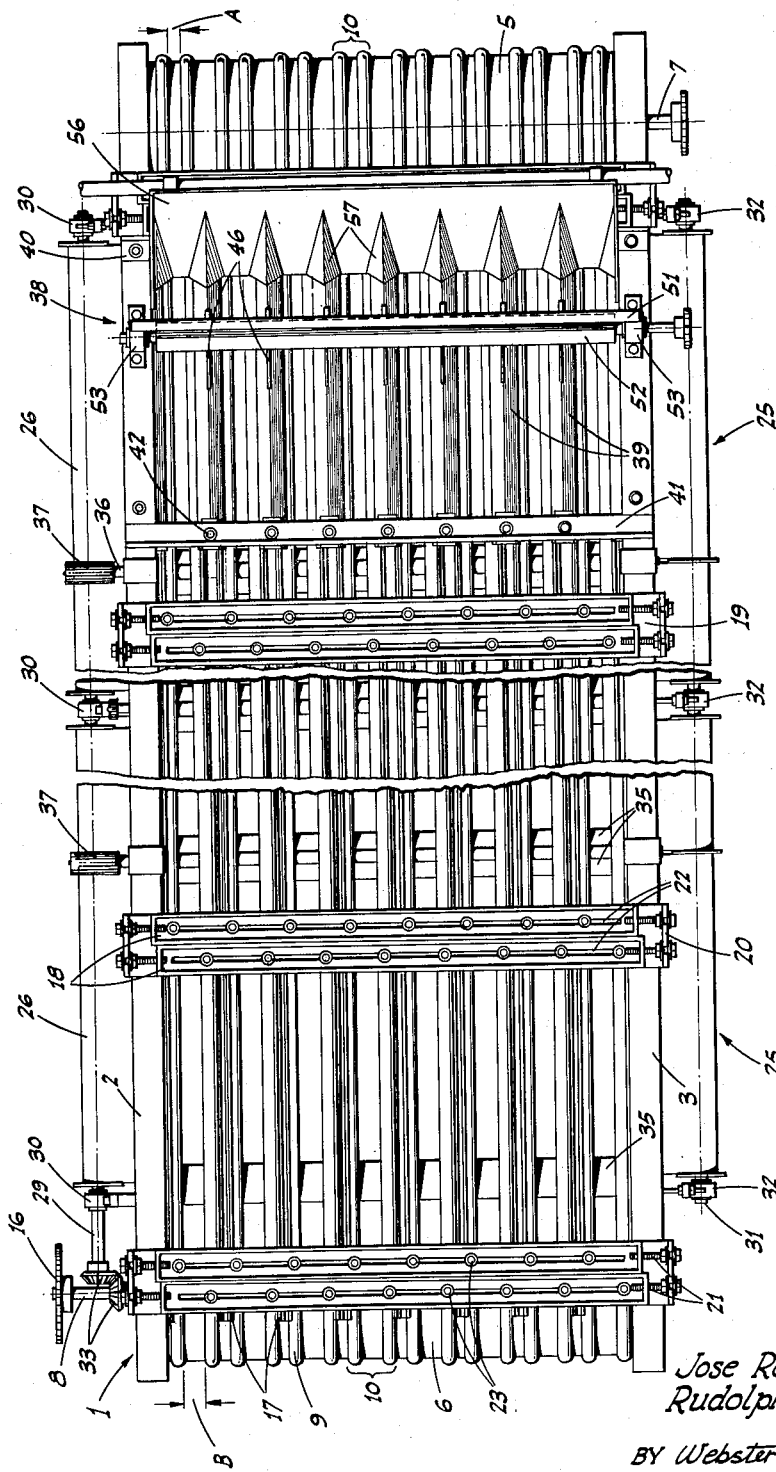

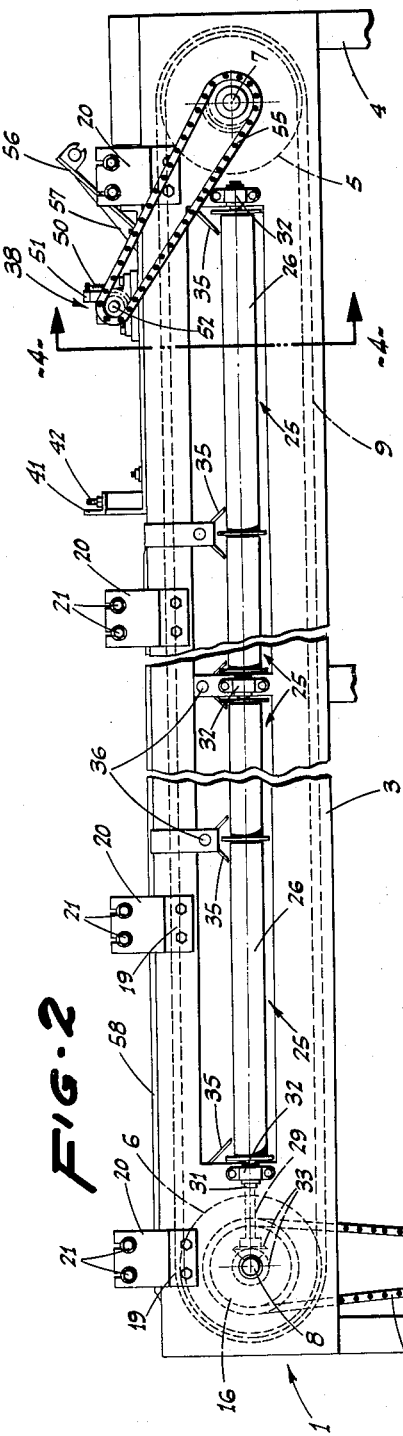

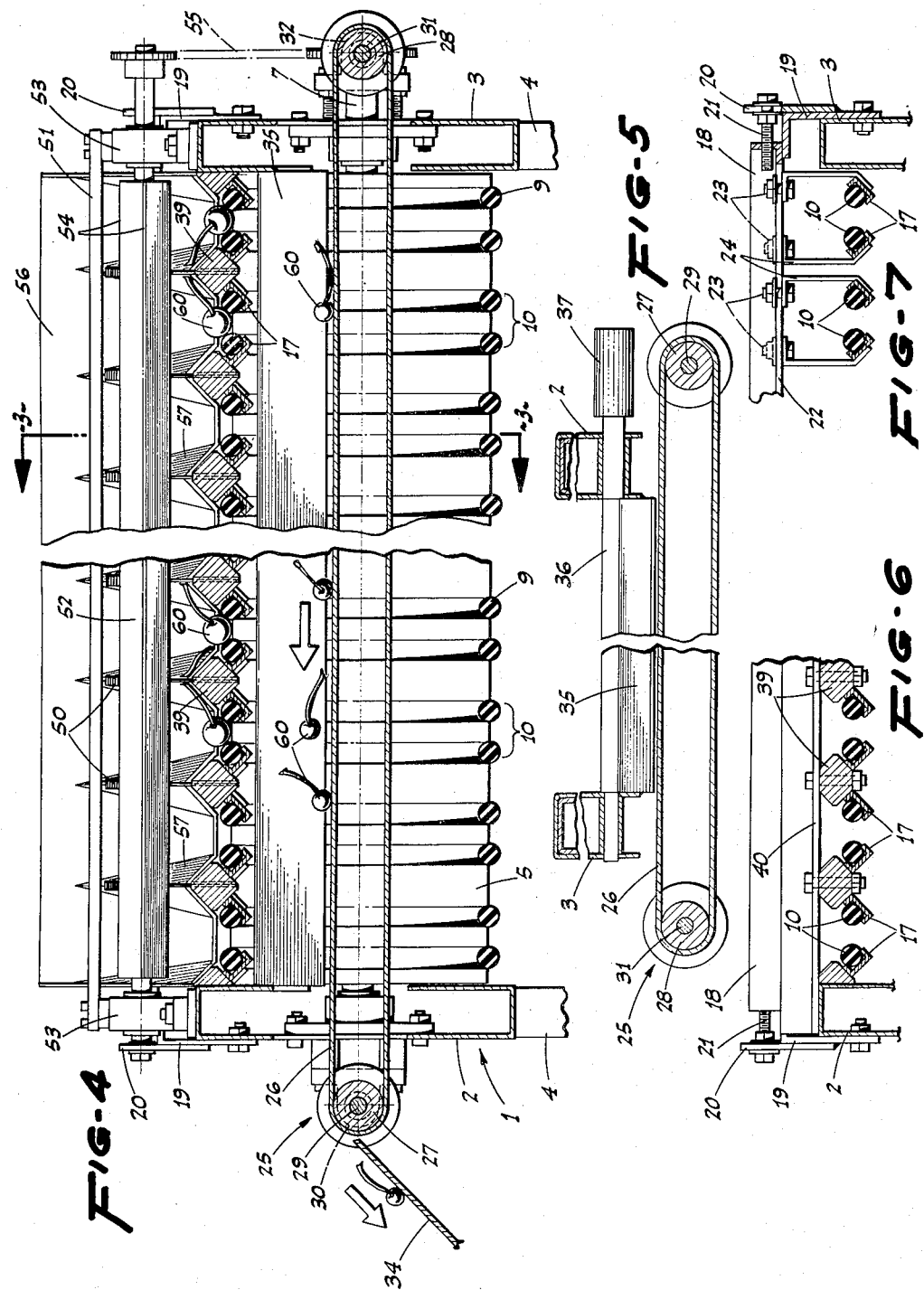

3,115,169
STEM SPLITTER AND GRADER FOR CHERRIES
Jose Rodriguez, 104 W. 10th St., Stockton, Calif., and Rudolph Rodriguez, Stockton, Calif.; said Rudolph Rodriguez assignor to said Jose Rodriguez
Filed May 14, 1962, Ser. No. 194,371
6 Claims. (Cl. 146—1)

This invention relates in general to a machine for use in the fresh cherry packing industry.

The major object of the invention is to provide a combination machine which is operative to separate or split "doubles" included in the bulk of cherries fed to the machine, and to then grade the cherries for size. "Doubles" are those pairs of cherries whose stems are connected, at the end opposite the fruit, by a nub; it being requisite that such doubles be separated before size grading and packing.

Another important object of the invention is to provide a combination machine, for the purpose described, which embodies a novel power actuated splitting mechanism which includes supporting and guide bars along which the doubles are moved in straddling relation and a scissors-like cutting blade assembly associated with each such bar to cut the doubles apart at or adjacent the connecting nub.

An additional object of the invention is to provide the machine with a novel power actuated mechanism for grading the cherries to size; such grading mechanism including a plurality of pairs of transversely spaced endless belts with the belts of each pair in diverging relation from the rear to the front end of the machine. Thus, cherries delivered onto the pairs of belts, in a receiving zone adjacent the rear of the machine, will thence be carried forward and size-graded by dropping between the belts of the pairs at the point where the belt spacing is greater than the diameter of the cherries carried thereby.

It is also an object of the invention to provide the machine with a novel mounting arrangement for the longitudinal channels employed to support and guide the upper runs of the endless belts from one end of the machine to the other.

A still further object of the invention is to provide a practical, reliable, and durable stem splitter and grader for cherries, and one which is exceedingly effective for the purpose for which it is designed.

These objects are accomplished by means of such structure and relative arrangement of parts as will fully appear by a perusal of the following specification and claims.

In the drawings:

FIG. 1 is a foreshortened, top plan view of the machine.

FIG. 2 is a side elevation of the same.

FIG. 3 is an enlarged fragmentary longitudinal sectional elevation of the rear portion of the machine; the view being substantially on line 3—3 of FIG. 4.

FIG. 4 is an enlarged cross section on substantially line 4—4 of FIG. 2.

FIG. 5 is a fragmentary cross section on substantially line 5—5 of FIG. 3.

FIG. 6 is a fragmentary cross section on substantially line 6—6 of FIG. 3.

FIG. 7 is a fragmentary cross section on substantially line 7—7 of FIG. 3.

Figure 8:
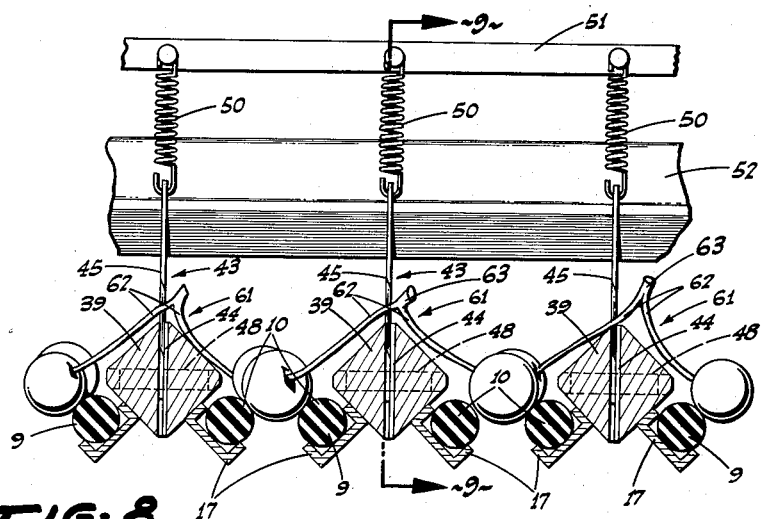
FIG. 8 is an enlarged fragmentary cross section on substantially line 8—8 of FIG. 3.
Figure 9:
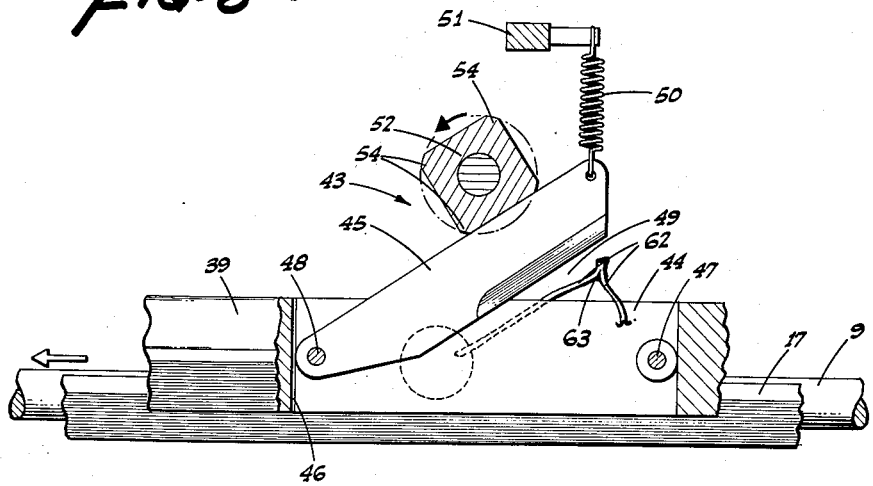
FIG. 9 is a fragmentary longitudinal section on substantially line 9—9 of FIG. 8.
Figure 10:
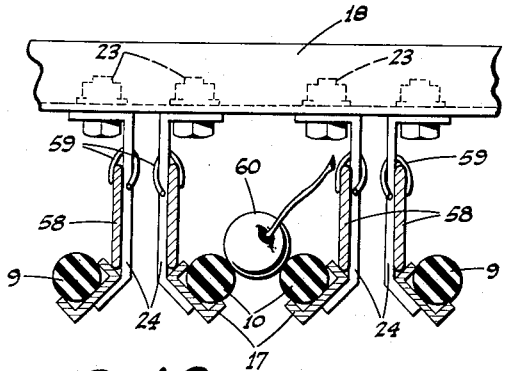
FIG. 10 is an enlarged fragmentary cross section on substantially line 10—10 of FIG. 3.

Referring now more particularly to the drawings and to the characters of reference marked thereon, the machine comprises an open elongated frame indicated generally at 1; such frame including sides 2 and 3, and supporting corner legs 4.

A rear drum 5 and a front drum 6 extend between and are journaled in connection with the frame sides 2 and 3; the rear drum including a cross shaft 7, and the front drum a cross shaft 8.

A multiplicity of endless belts 9 are trained about and extend between the rear drum 5 and the front drum 6; such belts 9 being arranged in pairs with each pair indicated at 10. The belts 9 of each pair 10 diverge in a forward direction (i.e. from the rear drum 5 to the front drum 6); the extent of divergence being the difference between the dimension A at the rear drum and the dimension B at the front drum, and such divergence being maintained by reason of the fact that the drums are grooved for the reception of the belts 9.

The belts 9—which are preferably of rubber—are circular and of relatively small diameter in cross section.

The front drum 6 is driven in a direction to simultaneously advance the upper runs of the belts 9, and this is accomplished as follows:

At the front portion thereof, the elongated frame 1 includes a sub-platform 11 supporting an electric motor 12 which, through an endless belt drive 13, actuates a speed reduction gear box 14 likewise mounted on such sub-platform. An endless chain drive 15 extends from the gear box 14 upwardly to driving connection with a sprocket 16 on the front cross shaft 8.

In order to maintain the upper runs of the belts 9 of each pair 10 in proper divergence from end to end of the machine; i.e. without laterally outward deflection or downward sagging—and with such runs remaining unobstructed at the top and inner sides—the following supporting and guide arrangement is embodied in the machine;

The upper runs of the belts 9 of each pair 10 are embraced at the outer sides and bottom by corresponding substantially full length longitudinal supporting and guide channels 17; such channels being canted to face laterally inward at an upward diagonal. Each pair of supporting and guide channels 17 are suspended in position, as follows:

At longitudinally spaced points, in the length of the machine, there are pairs of transversely extending side-by-side cross beams 18; each such pair of cross beams being supported at the ends above but from the sides 2 and 3 of the frame 1 by means of inverted L-shaped brackets 19 fixed to and upstanding from such sides. The brackets 19 also include upstanding flanges 20, and adjustment screws 21 connect between the flanges 20 and the adjacent end of each of the cross beams 18.

The cross beams 18 of each pair are longitudinally slotted, as at 22, for the reception of bolts 23 which adjustably secure hangers 24 to the underside of such beams 18 in dependent relation. The hangers 24 extend downwardly to the outer sides of corresponding channels 17 and are thence fixed to the backside of the latter.

In order to facilitate proper positioning or setting of the channels 17 by the adjustable cross beams 18, the hangers 24 on all corresponding channels are attached to the same one of each pair of cross beams 18, while all of the opposed hangers 24 are attached to the other one of each pair of said cross beams 18.

A plurality of transversely extending endless carry-off conveyors—each indicated generally at 25—are disposed in the frame 1 in close side-by-side relation; such carry-off conveyors 25 being disposed horizontally below the upper runs of the belts 9 but above the lower runs thereof.

The endless carry-off conveyors 25—each of which is adapted to receive cherries of a different size—are of a length to extend beyond the sides 2 and 3 of the frame 1; such sides being open (as shown) to permit projection of the end portions of said conveyors.

Each such endless carry-off conveyor 25 is comprised of a flat endless belt 26 of substantial width, which belt is carried on and extends between end flanged rollers indicated at 27 and 28. The end flanged rollers 27, which are in axial alinement, are all carried on a common driven longitudinal shaft 29 supported in outboard relation beyond the side 2 by means of standoff bearings 30.

Similarly, all of the end flanged rollers 82 are carried on a longitudinal idler shaft 31 disposed outboard of the side 3 and supported by standoff bearings 32.

The longitudinal shaft 29 is driven from the front cross shaft 8 by means of bevel gears 33, and when said shaft 29 is actuated all of the carry-off conveyors 25 travel in the same direction; the upper runs of the different belts 26 being adapted to each discharge onto a corresponding suitable lateral chute 34.

Above each of the conveyors 25 and along opposite side portions of the upper runs thereof, there are downwardly and inwardly inclined deflector plates 35 suitably mounted in connection with and extending between the sides 2 and 3 of the frame 1; such deflector plates preventing any fruit loss laterally from the conveyors 25, or transfer from one conveyor to another.

A transverse roller 36 is journaled in connection with and extends between the sides 2 and 3 above the apex defined by adjacent ones of the deflector plates 35; each such roller projecting beyond the side 2 and there being formed with a hand grip 37 whereby said transverse rollers 36 may be manually turned and for the purpose that will hereinafter appear.

At the rear end of the machine and directly above the rearmost carry-off conveyor 25, there is included a mechanism indicated generally at 38 and whose purpose is to split or separate any cherry doubles in the bulk of cherries delivered to the machine in the zone of and through such mechanism 38; the latter comprising the following:

The cherry stem splitting mechanism 38 comprises a plurality of longitudinally extending transversely spaced supporting and guide bars 39 which extend full length of said mechanism 38; such bars 39 being supported by a rear cross member 40 and an elevated front cross member 41 having suspension bolts 42 which extend downwardly to connection with said bars. The bars 39 occupy positions in closure relation between the corresponding rear portions of the back-to-back channels 17 of adjacent pairs thereof; such bars 39 being substantially rectangular in cross section and disposed with one edge uppermost whereby adjacent upper surfaces of said bars extend downwardly in divergent relation, and with the lower surfaces matchingly engaging the back-to-back channels 17, all as clearly shown in FIG. 8. In addition to providing a closure for the space between the back-to-back channels 17 in the fruit receiving zone of the machine, such bars 39, extending above the channels 17, serve to receive and support—in straddling relation—cherry doubles as fed from above to the machine, all as will more particularly hereinafter appear.

Intermediate the ends thereof, each bar 39 is fitted with a power actuated cutting unit indicated generally at 43, and which unit comprises a fixed longitudinally extending stationary blade 44 and a normally rearwardly and upwardly inclined movable blade 45. The stationary blade 44 is disposed in a longitudinal slot 46 in the related bar 39 and open to the apex or upper edge thereof; such stationary blade 44 being positioned in the slot with the upper edge of said blade flush with such apex. The stationary blade 44 is maintained in the slot 46 by a rear cross pin 47 and a front cross pin 48; the latter also serving as the pivot for the front or lower end of the movable blade 45 and whose lower portion also extends into the slot 46.

In the normal rearwardly and upwardly inclined position of the movable blade 46, the latter—together with the stationary blade 44—defines a rearwardly opening scissors-like gap 49 above the related bar 39.

All of the movable blades 45 are yieldably urged upwardly to raised position by tension springs 50 connected between said blades 45 and an elevated cross member 51 which spans between the sides 2 and 3 of the frame.

A transverse rotary cam shaft 52 is journaled, as at 53, on the sides of the frame and spans therebetween immediately above and in engagement with the upper edges of all of the movable blades 45; such rotary cam shaft 52 being substantially rectangular in cross section whereby to provide a plurality of circumferentially spaced high points or lobes 54. The rotary cam shaft 52 is driven from the rear cross shaft 7 by an endless chain drive 55.

Upon rotation of the cam shaft 52, all of the movable blades 45 are simultaneously and recurringly lowered to close the scissors-like gaps 49 whereby to impart a cutting action to all of the cutting units 43.

At the rear end of the machine and back of said cutting units 43, there is provided a forwardly and downwardly inclined chute plate 56 which extends transversely from side to side of the machine. Such chute plate 56 is formed throughout its transverse extent with a plurality of rearwardly tapered outstanding guide ribs 57 corresponding to and which matchingly engage over the rear end portions of the bars 39.

Such bars 39 terminate at their forward ends substantially below the elevated front cross member 41; and therebeyond in a forward direction and for the remaining length thereof, the channels 17 of each pair thereof are provided with upstanding longitudinally extending guard strips 58 Such guard strips rest against the related hangers 24 and are secured thereto by horseshoe-like clips 59.

In operation of the above described machine, fresh cherries in bulk are fed or delivered by any suitable means (not shown) onto the forwardly and downwardly inclined chute plate 56 in a spread from side to side thereof. The single cherries 60—each with an individual stem—are deflected by the ribs 57 and the bars 39 onto the upper runs of the pairs 10 of belts 9.

As so supported, the cherries are advanced by said upper runs of the pairs of belts and at the point where the belt spacing of each pair becomes greater than the diameter of the supported cherries, the latter fall through the space and are received on the endless carry-off conveyor 25 directly therebelow In this way, the several carry-off conveyors 25 receive and discharge laterally from the machine cherries graded to different size.

In the rear of the machine; i.e. the rear portion thereof as embraced by the mechanism 38, the bars 39 prevent any of the cherries from escaping downward between back-to-back channels 17 of adjacent pairs of the latter. Forwardly of the mechanism 38; i.e. ahead of the bars 39 and for substantially the remaining length of the machine, the guard strips 58 prevent lateral escape of the cherries being advanced on the upper runs of any pair of belts.

In the bulk of cherries delivered to the chute plate 56 and thence fed into the machine, there always exist a number of cherry doubles and which must be separated or split apart for effective grading. The mechanism 38 serves to accomplish such separating or splitting apart of the cherry doubles, as follows:

As the cherry doubles, indicated at 61, slide down the chute plate 56, substantially all are first engaged by the guide ribs 57, and which ribs thence direct such doubles onto the supporting and guide bars 39 in straddling relation (see FIG. 8) at a point ahead of the cutting units 43. Each cherry double includes a pair of stems 62 connected by a nub 63.

Upon each cherry double 61 being received in straddling relation on one of the supporting and guide bars 39, the cherries themselves rest on the upper runs of the pair of belts at each side of such bar, so that such cherry double is then advanced on said bar. With such advance, each cherry double is brought into the operating zone of the related cutting unit 43; i.e. into the scissors-like gap 49 whereupon such cutting unit—recurringly operating—severs the cherry double at or adjacent the nub 63. With such severance, each cherry double becomes two separated cherries each with a single stem, thus being carried forward by the upper runs of the belts for grading in the same manner previously described with respect to those cherries which are singles at the outset.

During normal operation of the machine, it is possible that a certain amount of debris—and even now and then an uncut cherry double 61—will pass onto the grading belts and ultimately deliver onto the carry-off conveyors 25, and sometimes such debris or cherry doubles—though minimum in amount—will be caught by or engaged over the apex defined by adjacent deflector plates 35 and the related roller 36. In such event and in order to free such debris or cherry double, the operator merely grasps the hand grip 37 and actuates it so as to turn the roller 36, causing the debris or uncut double to discharge on one or another of the adjacent conveyors 25.

With the above described machine, cherries are rapidly, efficiently, and economically size-graded, all with a minimum attendance on the part of the operator of the machine.

From the foregoing description, it will be readily seen that there has been produced such a machine as substantially fulfills the objects of the invention, as set forth herein.

While this specification sets forth in detail the present and preferred construction of the machine, still in practice such deviations from such detail may be resorted to as do not form a departure from the spirit of the invention, as defined by the appended claims.

Having thus described the invention, the following is claimed as new and useful and upon which Latters Patent is desired:

1. A size grading machine for fresh cherries comprising an elongated frame having transversely spaced sides, a rear drum and a front drum extending between and journaled in connection with the sides of the frame, a multiplicity of endless belts trained about and running between the drums in transversely spaced relation, means to drive one drum to simultaneously advance the upper runs of the belts, said belts being in pairs with the belts of each pair diverging from the rear drum to the front drum, means on the frame supporting and guiding the upper runs of the belts of each pair and with the top and adjacent sides of said runs unobstructed, said supporting and guide means including a pair of substantially full length channels disposed in generally facing relation and extending longitudinally of corresponding upper runs of each pair of belts, the belts being circular and of relatively small diameter in cross section, said upper runs of each pair of belts being embraced from the outer sides by the related channels, means to deliver cherries from above and downwardly toward the upper runs of the belts in a receiving zone adjacent the rear drum, longitudinal bars positioned in closure relation between the portions in said zone of the back-to-back channels of adjacent pairs thereof, the top of such bars being above the upper runs of the belts, said bars being operative to deflect cherries onto the upper runs of the belts and to serve as a stem support and guide for doubles received on and advanced in straddling relation to said bars, power actuated cutting units associated with the bars operative to split the doubles as so advanced on such bars, and a plurality of separate, cherry carry-off means disposed beneath the upper runs of the belts and in closely adjacent positions longitudinally of the frame; each cutting unit including a fixed longitudinal bottom blade, and a vertically reciprocable longitudinal upper blade, the blades being relatively pivotally connected adjacent their forward ends, the fixed blade being recessed into the related bar flush with the top thereof, spring means acting to yieldably raise the upper blade so as to define, with the lower blade, a rearwardly facing scissors-like gap above the corresponding bar, and power actuated means to recurringly lower the upper blade to close such gap.

2. A machine, as in claim 1, including a cross member mounted in connection with and extending between the sides of the frame above all of the upper blades of the cutting units; said spring means being tension springs connected between such cross member and the upper blades; and said power actuated means being a driven transverse cam shaft journaled in connection with and extending between the sides of the frame above, but in engagement with the upper edges of, all of said upper blades.

3. In a size grading machine for fresh cherries, a plurality of transversely spaced pairs of endless driven belts having substantially horizontal upper runs, said runs of each pair diverging from their rear to their forward ends, bars extending forwardly from the rear ends of the belts and disposed between the adjacent belts of adjacent pairs in closing relation to the lateral space between such belts, each bar in cross section being formed with downwardly diverging walls above said adjacent belts, means to discharge cherry doubles onto the bars so that the nub-connected stems of the doubles straddle the bars while the cherries themselves ride on adjacent belts and, with their stems, are advanced thereby, and a cutting unit mounted on each bar adjacent the rear ends of the belts to cut through the stems adjacent the connecting nub as they are thus advanced.

4. A machine, as in claim 3, in which each bar is provided with a longitudinal vertical slot between said diverging walls, and the cutting unit comprises cooperating upper and lower cooperating longitudinally extending blades, the lower blade being sunk in the slot with the cutting edge of said blade flush with the top of the bar, means pivoting the blade at its forward end in connection with the lower blade, and mechanism to oscillate the upper blade up and down from its lowered cutting position.

5. A machine, as in claim 4, in which said mechanism comprises yieldable means to lift the upper blade, and a driven rotary cam to intermittently lower said blade.

6. In a size grading machine for fresh cherries, a pair of endless driven belts having substantially horizontal upper runs diverging relative to each other from their rear to their forward ends, a pair of separate transverse cherry receiving members disposed in side by side relation below and spaced from said belt runs, a pair of fixed transverse deflector plates disposed in the space between said members and the belt runs and arranged in downwardly diverging relation to each other over the plane of separation of said members, a transverse roller turnably mounted adjacent and above said plates in a position centrally therebetween, and an element on one end of the roller for hand engagement whereby to turn the roller.

References Cited in the file of this patent

UNITED STATES PATENTS

| | | |
|---|---|---|
| 1,352,780 | Bird | Sept. 14, 1920 |
| 1,984,672 | De Back | Dec. 18, 1934 |
| 2,316,159 | Evett | Apr. 13, 1943 |
| 2,686,591 | Harden | Aug. 17, 1954 |
| 2,732,939 | Holzenthal et al. | Jan. 31, 1956 |
| 2,825,375 | Gotelli | Mar. 4, 1958 |
| 3,002,618 | Derderian et al. | Oct. 3, 1961 |